United States Patent [19]

DeMunn et al.

[11] 3,957,499

[45] May 18, 1976

[54] FAST-FADING INDEX-CORRECTED PHOTOCHROMIC GLASS COMPOSITIONS

[75] Inventors: Clark V. DeMunn; David J. Kerko; Ralph A. Westwig, all of Corning, N.Y.

[73] Assignee: Corning Glass Works, Corning, N.Y.

[22] Filed: Nov. 11, 1974

(Under Rule 47)

[21] Appl. No.: 522,494

[52] U.S. Cl............................. 106/54; 106/DIG. 6; 106/47 Q
[51] Int. Cl.².................. C03C 3/26; C03C 3/08; G02B 1/08
[58] Field of Search................ 106/DIG. 6, 54

[56] References Cited
UNITED STATES PATENTS

| | | | |
|---|---|---|---|
| 3,197,296 | 7/1965 | Eppler et al. | 106/DIG. 6 |
| 3,419,370 | 12/1968 | Cramer | 106/54 |
| 3,540,793 | 11/1970 | Araujo | 106/DIG. 6 |

OTHER PUBLICATIONS

Yokota, R. "Phototropic Glass", Kotai Butsuri 1968, 3(s) 265–269 in Chemical Abstracts, Vol. 69, 1968, 72798p.

*Primary Examiner*—Winston A. Douglas
*Assistant Examiner*—Mark Bell
*Attorney, Agent, or Firm*—Kees van der Sterre; Clinton S. Janes, Jr.; Clarence R. Patty, Jr.

[57] ABSTRACT

Photochromic glasses having index of refraction values ($n_D$) in the range from 1.52–1.54, compositions comprising, in weight percent, about 49–60% $SiO_2$, 2–9% $Al_2O_3$, 15–18% $B_2O_3$, 6–12% $Na_2O$, 9–18% $ZrO_2$, 0.5–0.9% Ag, 0.5–0.8% Cl, 0.010–0.030% CuO, 0.5–1% PbO, and 1–2% F, and rapid fading characteristics such that at least about 65% of the optical density gained during darkening is lost within a five-minute fading interval, are disclosed.

1 Claim, No Drawings

FAST-FADING INDEX-CORRECTED PHOTOCHROMIC GLASS COMPOSITIONS

Photochromic glasses, or phototropic glasses as they have been variously called, are glasses which darken under the influence of actinic radiation, normally ultraviolet radiation, and which return to the clear state when the actinic radiation is removed. U.S. Pat. No. 3,208,860, which is the basic patent in the field, describes a family of silicate glass compositions containing submicroscopic crystals of a silver halide dispersed throughout the glassy matrix, which crystals are reversibly darkenable under the action of ultraviolet radiation, imparting to the glass the characteristic of variable light transmission depending upon the amount of ultraviolet radiation present in radiation incident thereupon.

While glasses such as described in the aforementioned patent exhibit desirable photochromic properties for a variety of applications, there is a need for a photochromic glass for ophthalmic applications which will darken and fade rapidly while at the same time achieving an adequate degree of darkness is ophthalmic thicknesses (i.e., about 2 mm.) when exposed to the sun's rays. Furthermore glasses for this application must have an index of refraction ($n_D$) of 1.52–1.54 to permit their use without requiring alteration of equipment utilized by opticians for grinding and testing conventional ophthalmic lenses.

U.S. Pat. No. 3,197,296 describes alkali boroaluminosilicate glasses containing submicroscopic silver halide crystals which exhibit properties which are very desirable for ophthalmic applications. Hence the glasses described in that patent have refractive indices ($n_D$) within the desired range, exhibit the desired degree of darkenability to be useful in ophthalmic thicknesses, and demonstrate darkening and fading rates which are acceptable for ophthalmic lenses.

One of the most important properties of photochromic glasses to be utilized for ophthalmic applications is the fading rate or rate at which the darkened glass returns to the clear state upon cessation of the activating radiation. Hence while moderate darkening rates might be tolerated in ophthalmic lenses with, at most, slight discomfort to the wearer when first exposed to bright light conditions, a rapid fading rate is extremely desirable to aid in the adjustment to a sudden decrease in the available light such as might occur when the wearer enters a dimly-lit building or room.

One useful index of the fading characteristic of a photochromic glass is the so-called half-fading time ($t_{HF}$) of the glass, which is the time required for the glass to recover to the geometric average $\sqrt{T_o \times T_\infty}$ of the initial transmission (percent transmittance) ($T_o$) and the fully-darkened transmission ($T\infty$). More recently, the five-minute darkening and fading levels of glasses have been used as measures of their photochromic properties. Thus, the fading characteristics of glasses may be compared on the basis of the recovery of the darkened glass to the clear state in a five-minute fading interval. For the purpose of the present description this fading characteristic will be referred to as the five-minute fading recovery of a glass (%$F_5$), defined as the ratio of the decrease in optical density of a darkened glass observed over a five-minute fading period ($\Delta D_{f5}$) to the increase in optical density observed on darkening the glass for five minutes ($\Delta D_{d5}$), expressed as a percent. Thus %$F_5 = [\Delta D_{f5}/\Delta D_{d5}] \times 100$. The optical density of a glass is conventionally defined as the logarithm to the base 10 of the inverse of the transmittance of the glass.

Prior art index-corrected photochromic ophthalmic glasses of the kind described, for example, in U.S. Pat. No. 3,197,296, typically exhibit half-fading times on the order of 3–5 minutes, although a few fade slightly faster. This range of fading time has been correlated on an empirical basis to losses of about 50–62% of the optical density gained during darkening of the glass in a five minute fading interval. In other words, %$F_5$ values for these prior art glasses are largely in the range of about 50–62%.

It would be very desirable to have index-corrected photochromic glasses having five-minute fading recoveries (%$F_5$) substantially in excess of these values for ophthalmic applications. Of course, in addition to fast fading and proper refractive index, the glass would also have to be free of haze, demonstrate good chemical durability, and exhibit a high degree of darkening on exposure to activating radiation such as ultraviolet light.

We have now discovered a family of photochromic glasses exhibiting the standard properties required for ophthalmic applications, and, in addition, exhibiting a fading rate substantially faster than prior art index-corrected photochromic glasses of which we are aware. These glasses comprise, as essential constituents, in weight percent as calculated from the batch, about 49–60% $SiO_2$, 2–9% $Al_2O_3$, 15–18% $B_2O_3$, 6–12% $Na_2O$, 9–18% $ZrO_2$, 0.50–0.90% Ag, 0.50–0.80% Cl, 0.010–0.030% CuO, 0.3–1.0% PbO, and 1–2% F, these constituents comprising at least about 94% by weight of the composition. They may additionally contain, as optional constituents, 0–6% $K_2O$, 0–3% $Li_2O$, 0–4% BaO, 1–1% MgO, 0–2% $TiO_2$, 0–0.5% Br and 0–0.5% I.

Glasses within the scope of the invention are refractive-index-corrected, having $n_D$ values in the range of about 1.52–1.54. They also have good chemical durability and a high level of darkenability when exposed to ultraviolet light. And finally, these glasses exhibit fading rates substantially faster than prior art index-corrected photochromic glasses. Glasses within the scope of our invention demonstrate five-minute fading recoveries (%$F_5$) of at least about 65% when calculated as above described, and several demonstrate values in excess of 80% in a five-minute fading interval.

This faster-fading characteristic of our glasses is attributed largely to the use of increased quantities of zirconia and decreased quantities of lead and barium to control the refractive index values of the glass. The concentrations of constituents employed in making the glass must be kept within the above-described ranges if photochromic glasses having good darkening, fast fading, and proper refractive index characteristics are to be obtained.

Glasses within the scope of the above-defined composition range may be produced in accordance with conventional glass practice by melting batches of the specified compositions in pots, tanks or crucibles at temperatures in the range of about 1500°–1650°C., forming the molten glasses into articles of the desired shapes by conventional glass-working techniques such as drawing, pressing, blowing, casting or the like, and thereafter heat treating the glass articles at temperatures in the range of about 500°–650°C. for a time in the range of about 1/2–4 hours to cause the precipitation of silver chloride crystallites in the glass, thereby providing the desired phototropicity. The batch compositions for these glasses may comprise any ingredients, whether oxides or other compounds, which are converted to the specified components in the proper proportions at the temperatures utilized for melting a batch.

Table I below sets forth examples of compositions of glasses coming within the scope of the present invention. The compositions set forth in Table I are expressed in parts by weight as calculated from the batch.

Glass articles of the compositions set forth in Table I above are obtained by melting conventional batch ingredients in suitable proportions in covered crucibles for 4 hours, most melting at 1550°C., except for compositions containing large zirconia additions which are melted at 1600° or 1650°C. The melts are then formed into glass slabs about 6 by 6 by ⅜ inches in size by pouring into molds. Finally, the slabs are annealed at 500°C. and slowly cooled to room temperature.

The annealed slabs are then cut into glass sections and subjected to a heat treatment to develop he photochromic properties of the glass. Examples of specific

TABLE I

|  | 1 | 2 | 3 | 4 | 5 | 6 | 7 | 8 | 9 | 10 |
|---|---|---|---|---|---|---|---|---|---|---|
| $SiO_2$ | 53.3 | 52.1 | 54.1 | 53.9 | 53.8 | 53.7 | 52.1 | 52.1 | 51.7 | 51.4 |
| $Al_2O_3$ | 9.0 | 8.8 | 6.1 | 5.1 | 4.1 | 3.1 | 8.8 | 8.8 | 8.7 | 8.7 |
| $B_2O_3$ | 16.7 | 16.3 | 16.9 | 16.8 | 16.8 | 16.8 | 16.3 | 16.3 | 16.2 | 16.1 |
| $Na_2O$ | 10.8 | 10.6 | 11.0 | 11.0 | 10.9 | 10.9 | 10.6 | 10.6 | 10.5 | 10.5 |
| PbO | 0.5 | 0.5 | 0.5 | 0.5 | 0.5 | 0.5 | 0.5 | 0.5 | 0.5 | 0.5 |
| $ZrO_2$ | 9.7 | 9.5 | 11.6 | 12.7 | 13.9 | 15.1 | 9.5 | 9.5 | 9.4 | 9.4 |
| Ag | 0.53 | 0.53 | 0.53 | 0.53 | 0.53 | 0.53 | 0.53 | 0.53 | 0.53 | 0.53 |
| Cl | 0.60 | 0.60 | 0.60 | 0.60 | 0.60 | 0.60 | 0.60 | 0.60 | 0.60 | 0.60 |
| F | 1.2 | 1.2 | 1.2 | 1.2 | 1.2 | 1.2 | 1.2 | 1.2 | 1.2 | 1.2 |
| CuO | 0.024 | 0.024 | 0.024 | 0.024 | 0.024 | 0.024 | 0.024 | 0.024 | 0.024 | 0.024 |
| BaO | — | 1.5 | — | — | — | — | 1.9 | 2.3 | 3.0 | 3.5 |
| MgO | — | 0.8 | — | — | — | — | 0.4 | — | — | — |

|  | 11 | 12 | 13 | 14 | 15 | 16 | 17 | 18 | 19 | 20 |
|---|---|---|---|---|---|---|---|---|---|---|
| $SiO_2$ | 52.7 | 52.6 | 52.5 | 52.5 | 51.7 | 49.3 | 51.4 | 52.1 | 52.4 | 51.4 |
| $Al_2O_3$ | 8.9 | 8.9 | 8.9 | 8.9 | 8.7 | 8.3 | 8.7 | 8.7 | 8.8 | 8.6 |
| $B_2O_3$ | 16.5 | 16.5 | 16.4 | 16.4 | 16.2 | 15.5 | 16.2 | 16.2 | 16.4 | 16.1 |
| $Na_2O$ | 10.7 | 10.7 | 10.7 | 10.7 | 10.5 | 10.0 | 10.5 | 9.4 | 8.2 | 9.3 |
| PbO | 0.5 | 0.5 | 0.5 | 0.5 | 0.5 | 0.5 | 1.0 | 0.5 | 0.5 | 0.5 |
| $ZrO_2$ | 9.6 | 9.6 | 9.6 | 9.6 | 12.3 | 16.4 | 12.2 | 12.5 | 12.6 | 12.3 |
| Ag | 0.53 | 0.53 | 0.53 | 0.53 | 0.53 | 0.53 | 0.53 | 0.53 | 0.53 | 0.53 |
| Cl | 0.60 | 0.60 | 0.60 | 0.60 | 0.60 | 0.60 | 0.60 | 0.60 | 0.60 | 0.60 |
| F | 1.2 | 1.2 | 1.2 | 1.2 | 1.2 | 1.2 | 1.2 | 1.2 | 1.2 | 1.2 |
| CuO | 0.024 | 0.024 | 0.024 | 0.024 | 0.024 | 0.024 | 0.024 | 0.024 | 0.024 | 0.024 |
| $TiO_2$ | 1.0 | 1.2 | 1.5 | 0.5 | — | — | — | — | — | — |
| BaO | — | — | — | 1.0 | — | — | — | — | — | — |
| $Li_2O$ | — | — | — | — | — | — | — | 0.6 | 1.2 | — |
| $K_2O$ | — | — | — | — | — | — | — | — | — | 1.8 |

|  | 21 | 22 | 23 | 24 | 25 | 26 | 27 | 28 | 29 | 30 |
|---|---|---|---|---|---|---|---|---|---|---|
| $SiO_2$ | 50.8 | 51.4 | 51.7 | 51.7 | 51.7 | 51.7 | 51.7 | 54.1 | 55.1 | 56.2 |
| $Al_2O_3$ | 8.5 | 8.6 | 8.7 | 8.7 | 8.7 | 8.7 | 8.7 | 6.1 | 5.1 | 4.1 |
| $B_2O_3$ | 16.0 | 16.0 | 16.5 | 16.5 | 16.5 | 16.5 | 16.5 | 16.9 | 16.9 | 16.9 |
| $Na_2O$ | 6.8 | 6.8 | 10.5 | 10.5 | 10.5 | 10.5 | 10.5 | 11.0 | 10.9 | 10.9 |
| PbO | 0.5 | 0.5 | 0.5 | 0.5 | 0.5 | 0.5 | 0.5 | 0.5 | 0.5 | 0.4 |
| $ZrO_2$ | 12.2 | 11.8 | 11.3 | 11.3 | 11.3 | 11.3 | 11.3 | 11.6 | 11.5 | 11.0 |
| $Li_2O$ | — | — | — | — | — | — | — | — | — | — |
| $K_2O$ | 5.4 | 5.4 | — | — | — | — | — | — | — | — |
| Ag | 0.53 | 0.60 | 0.53 | 0.63 | 0.73 | 0.83 | 0.63 | 0.60 | 0.60 | 0.60 |
| Cl | 0.60 | 0.70 | 0.60 | 0.60 | 0.60 | 0.60 | 0.75 | 0.70 | 0.70 | 0.70 |
| Br | — | — | — | — | — | — | — | — | — | — |
| F | 1.2 | 1.2 | 1.2 | 1.2 | 1.2 | 1.2 | 1.2 | 1.2 | 1.2 | 1.2 |
| CuO | 0.024 | 0.016 | 0.024 | 0.024 | 0.024 | 0.024 | 0.024 | 0.024 | 0.024 | 0.024 |

|  | 31 | 32 | 33 | 34 | 35 | 36 | 37 | 38 | 39 | 40 |
|---|---|---|---|---|---|---|---|---|---|---|
| $SiO_2$ | 57.3 | 58.3 | 58.1 | 55.4 | 54.3 | 54.3 | 54.3 | 54.1 | 51.7 | 51.7 |
| $Al_2O_3$ | 3.1 | 2.1 | 4.1 | 6.2 | 6.1 | 6.1 | 6.1 | 6.1 | 8.7 | 8.7 |
| $B_2O_3$ | 16.9 | 16.9 | 17.0 | 17.3 | 17.0 | 17.0 | 17.0 | 16.9 | 17.2 | 17.2 |
| $Na_2O$ | 10.9 | 10.9 | 11.1 | 6.3 | 8.6 | 7.4 | 6.1 | 11.0 | 10.5 | 10.5 |
| PbO | 0.4 | 0.4 | 0.4 | 0.4 | 0.4 | 0.4 | 0.4 | 0.4 | 0.4 | 0.4 |
| $ZrO_2$ | 11.5 | 11.5 | 9.2 | 11.9 | 11.6 | 11.6 | 11.6 | 11.6 | 11.3 | 11.3 |
| Ag | 0.60 | 0.60 | 0.60 | 0.60 | 0.60 | 0.60 | 0.60 | 0.60 | 0.63 | 0.63 |
| Cl | 0.70 | 0.70 | 0.70 | 0.70 | 0.70 | 0.70 | 0.70 | 0.70 | 0.60 | 0.60 |
| F | 1.2 | 1.2 | 1.2 | 1.2 | 1.2 | 1.2 | 1.2 | 1.2 | 1.2 | 1.2 |
| CuO | 0.024 | 0.024 | 0.024 | 0.020 | 0.020 | 0.020 | 0.020 | 0.020 | 0.020 | 0.020 |
| $Li_2O$ | — | — | — | 2.4 | 0.6 | 0.9 | 1.2 | — | — | — |
| $K_2O$ | — | — | — | — | 1.8 | 2.8 | 3.7 | — | — | — |
| Br | — | — | — | — | — | — | — | — | — | 0.25 |

|  | 41 | 42 |
|---|---|---|
| $SiO_2$ | 51.7 | 51.7 |
| $Al_2O_3$ | 8.7 | 8.7 |
| $B_2O_3$ | 17.2 | 17.2 |
| $Na_2O$ | 10.5 | 10.5 |
| PbO | 0.5 | 0.5 |
| $ZrO_2$ | 11.3 | 11.3 |
| Ag | 0.63 | 0.63 |
| Cl | 0.60 | 0.60 |
| F | 1.2 | 1.2 |
| CuO | 0.020 | 0.020 |
| Br | 0.50 | .25 |
| I | — | .25 | hat treating schedules which may be employed for this purpose are set forth in Table II below:

TABLE II

| Schedule A - | Heat at a rate of 800°C/hour to 540°C.; hold at 540°C. for ½ hour; heat at 800°C/hour to 605°C.; hold at 605°C. for 1 hour; cool at furnace rate to room temperature. |
|---|---|
| Schedule B - | Heat at a rate of 800°C/hour to 540°C.; hold at 540°C. for ½ hour; heat at 800°C/hour to 620°C.; hold at 620°C. for 1 hour; cool at furnace rate to room temperature. |
| Schedule C - | Heat at a rate of about 2500°C/hour to 620°C.; hold at 620°C. for ½ hour; cool at furnace rate to room temperature. |
| Schedule D - | Heat at 800°C/hour to 620°C.; hold at 620°C. for ½ hour; cool at furnace rate to room temperature. |

After heat treatment according to one of the schedules set forth above in Table II, glass samples having the compositions set forth in Table I are subjected to testing to evaluate the photochromic properties of the glass. The samples are in the form of glass sections 2 mm. thick which have been ground and polished to provide smooth, plane, parallel surfaces.

Testing of the glass samples comprises measuring the visible light transmittance of the clear (undarkened) glass ($T_o$), exposing the glass to an ultraviolet light source for five minutes to darken the glass, measuring the visible light transmittance of the darkened glass ($T_{d5}$), terminating ultraviolet irradiation and shielding the glass from all light for five minutes to allow fading to occur, and measuring the visible light transmittance of the glass at the end of the five-minute fading period ($T_{f5}$). The ultraviolet light source consists of two 15 watt black-light blue fluorescent ultraviolet lamps positioned four inches from the sample which are sufficient to substantially completely darken the glass during the five-minute darkening period.

Utilizing the data obtained as above described, the change in optical density on darkening ($\Delta D_{d5}$) is determined from the initial and darkened transmittances, and the change in optical density during the five-minute fading period ($\Delta D_{f5}$) is determined from the darkened and faded transmittances, for each sample. The optical density values may be computed from the transmittances according to the known formula: optical density $= \log_{10}(1/\text{transmittance})$, or optical density tables may be utilized. The five-minute fading recovery of each glass ($\%F_5$) is then computed from the ratio of the change in optical density on fading to the change in optical density on darkening according to the formula:

$$\%F_5 = |\Delta D_{f5}/\Delta D_{d5}| \times 100$$

Table III below sets forth photochromic properties data for glass samples having the compositions shown in Table I which are heat-treated according to the schedules set forth in Table II. Included in Table III are the composition numbers of the samples, as set forth in Table I, the index of refraction of each sample ($n_D$), the heat treatment schedule for each sample, as set forth in Table II, the percent visible light transmittance of each sample in the clear state ($T_o$), the percent visible light transmittance of each sample after a five-minute darkening exposure to the ultraviolet light source above described ($T_{d5}$), the percent visible light transmittance of each sample after five minutes of fading in the absence of light ($T_{f5}$), the half-fading times in seconds, where measured on individual samples, and the five-minute fading recovery for each sample, expressed as a percent ($\%F_5$).

TABLE III

| Composition No. | 1 | 2 | 3 | 4 | 5 | 6 | 7 | 8 | 9 | 10 |
|---|---|---|---|---|---|---|---|---|---|---|
| Refractive Index | 1.519 | 1.521 | 1.522 | 1.525 | 1.529 | 1.532 | 1.521 | 1.521 | 1.521 | 1.523 |
| Heat Treatment | A | C | B | A | B | A | D | A | A | A |
| $T_o$ | 91 | 91.5 | 92.0 | 90 | 88 | 90.0 | 92.0 | 91.0 | 91.5 | 91.0 |
| $T_{d5}$ | 29 | 28.5 | 32.0 | 37.5 | 31.5 | 48.5 | 33.0 | 32.0 | 34.0 | 31.5 |
| $T_{f5}$ | 67 | 65.0 | 69.0 | 72.5 | 64.0 | 78.5 | 68.0 | 67.0 | 70.0 | 67.0 |
| $t_{HF}$(sec) | 120 | 120 | 105 | 90 | 105 | 45 | 105 | — | — | — |
| $\%F_5$ | 73 | 71 | 73 | 75 | 69 | 79 | 71 | 71 | 73 | 71 |
| Composition No. | 11 | 12 | 13 | 14 | 15 | 16 | 17 | 18 | 19 | 20 |
| Refractive Index | 1.521 | 1.521 | 1.523 | 1.523 | 1.523 | 1.526 | 1.524 | 1.526 | 1.528 | 1.524 |
| Heat Treatment | D | D | D | D | D | D | C | B | C | B |
| $T_o$ | 91 | 90 | 90 | 91.5 | 90 | 90 | 91 | 90 | 90 | 90 |
| $T_{d5}$ | 34.5 | 34.0 | 31 | 31.0 | 36 | 42.5 | 31 | 38 | 38 | 35 |
| $T_{f5}$ | 70.5 | 69.5 | 63 | 64.0 | 76 | 80 | 65 | 78 | 76 | 74 |
| $t_{HF}$(sec) | 105 | 90 | 165 | 150 | 60 | 105 | 150 | 75 | 75 | 90 |
| $\%F_5$ | 74 | 74 | 67 | 67 | 82 | 84 | 69 | 83 | 81 | 79 |
| Composition No. | 21 | 22 | 23 | 24 | 25 | 26 | 27 | 28 | 29 | 30 |
| Refractive Index | 1.522 | 1.522 | 1.521 | 1.521 | 1.521 | 1.521 | 1.521 | 1.524 | 1.522 | 1.522 |
| Heat Treatment | B | C | C | A | C | B | C | A | C | A |
| $T_o$ | 90.5 | 91 | 91 | 91.5 | 91.0 | 90.0 | 91.0 | 91 | 91.5 | 91 |
| $T_{d5}$ | 46 | 39 | 33.5 | 32.0 | 31.5 | 26.0 | 28.0 | 34 | 35.5 | 35.5 |
| $T_{f5}$ | 83 | 77 | 71.5 | 73.0 | 70.5 | 59.0 | 62.0 | 69.5 | 70.5 | 70 |
| $t_{HF}$(sec) | — | 75 | 105 | 90 | 90 | 150 | 150 | 105 | 105 | 105 |
| $\%F_5$ | 87 | 80 | 76 | 79 | 76 | 67 | 67 | 73 | 72 | 72 |
| Composition No. | 31 | 32 | 33 | 34 | 35 | 36 | 37 | 38 | 38 | 40 |
| Refractive Index | 1.524 | 1.524 | 1.524 | 1.528 | 1.526 | 1.526 | 1.526 | 1.522 | 1.521 | 1.521 |
| Heat Treatment | A | B | A | C | C | C | C | C | C | B |
| $T_o$ | 91.5 | 91.5 | 91.5 | 91.0 | 90.5 | 90 | 89.0 | 92 | 91 | 90 |
| $T_{d5}$ | 43.0 | 43.5 | 41.5 | 30 | 29 | 38 | 46.0 | 40.5 | 26.5 | 36 |
| $T_{f5}$ | 75.0 | 74.0 | 73.0 | 67 | 60 | 74 | 78.0 | 73.0 | 58.5 | 72 |
| $T_{HF}$(sec) | 120 | 90 | 90 | 120 | 165 | 75 | 45 | 105 | 180 | 90 |
| $\%F_5$ | 74 | 71 | 71 | 72 | 64 | 77 | 81 | 72 | 64 | 76 |
| Composition No. | 41 | 42 | | | | | | | | |
| Refractive Index | 1.521 | 1.521 | | | | | | | | |
| Heat Treatment | B | B | | | | | | | | |
| $T_o$ | 90.5 | 91 | | | | | | | | |
| $T_{d5}$ | 55.0 | 38 | | | | | | | | |
| $T_{f5}$ | 86.0 | 75 | | | | | | | | |

TABLE III-continued

| Composition No. | 1 | 2 | 3 | 4 | 5 | 6 | 7 | 8 | 9 | 10 |
|---|---|---|---|---|---|---|---|---|---|---|
| $t_{1/F}$(sec) | | 45 | 90 | | | | | | | |
| %F$_5$ | 90 | 78 | | | | | | | | |

From the data set forth above in Table III it is apparent that photochromic glasses produced according to the invention exhibit substantially improved fading characteristics when compared to prior art glasses. Thus a glass provided as hereinabove described will typically demonstrate an optical density loss during a five-minute fading interval ($\Delta D_{f5}$) amounting to at least about 65% of the optical density gain observed during a five-minute darkening period ($\Delta D_{d5}$), which is substantially greater than similar fading losses exhibited by representative prior art index-corrected photochromic glasses of the silver-halide type.

Moreover these glasses exhibit good darkenability and high quality such that they are eminently suited for use as ophthalmic glasses or for any other applications wherein rapid fading characteristics in index-corrected photochromic glasses of optical quality would be desired.

We claim:

1. A photochromic glass consisting essentially, in weight percent as calculated from the batch, of about 49–60% $SiO_2$, 2–9% $Al_2O_3$, 15–18% $B_2O_3$, 6–12% $Na_2O$, 9–18% $ZrO_2$, 0.50–0.90% Ag, 0.50–0.80% Cl, 0.010–0.030% CuO, 0.3–1.0% PbO, the foregoing ingredients constituting at least 94% by weight of the glass, 0–6% $K_2O$, 0–3% $Li_2O$, 0–4% BaO, 0–1% MgO, 0–2% $TiO_2$, 0–0.5% Br and 0–0.5% I, said glass having an index of refraction ($n_D$) between about 1.52–1.54, and demonstrating, in 2 millimeter cross-section, an optical density loss during a five-minute fading interval from a fully darkened state which is at least 65% of the optical density gain developed during darkening to said fully darkened state.

* * * * *

UNITED STATES PATENT OFFICE
CERTIFICATE OF CORRECTION

PATENT NO. : 3,957,499
DATED : May 18, 1976
INVENTOR(S) : Clark V. DeMunn, David J. Kerko, and Ralph A. Westwig It is certified that error appears in the above-identified patent and that said Letters Patent are hereby corrected as shown below:

Front Page, Item [22] Filed: Nov. 11, 1974, delete "(Under Rule 47)".

Column 2, line 36, "1-1% MgO" should be -- 0-1% MgO --.

Columns 7 and 8, Table III-continued, line 5, delete Composition No. "1, 2, 3, 4, 5, 6, 7, 8, 9, 10" and insert Composition No. -- 41, 42 --.

Signed and Sealed this

Fourteenth Day of September 1976

[SEAL]

Attest:

RUTH C. MASON
Attesting Officer

C. MARSHALL DANN
Commissioner of Patents and Trademarks